(12) United States Patent
Takahashi et al.

(10) Patent No.: US 7,385,323 B2
(45) Date of Patent: Jun. 10, 2008

(54) ARMATURE OF ROTARY ELECTRICAL DEVICE

(75) Inventors: Hideaki Takahashi, Mori-machi (JP); Hisanobu Higashi, Mori-machi (JP); Susumu Andou, Mori-machi (JP); Hiroaki Kondou, Mori-machi (JP)

(73) Assignee: Yamaha Motor Electronics, Morimachi (JP)

( * ) Notice: Subject to any disclaimer, the term of this patent is extended or adjusted under 35 U.S.C. 154(b) by 385 days.

(21) Appl. No.: 10/709,243

(22) Filed: Apr. 23, 2004

(65) Prior Publication Data
US 2004/0256936 A1 Dec. 23, 2004

(30) Foreign Application Priority Data
May 8, 2003 (JP) .............................. 2003-129990

(51) Int. Cl.
*H02K 3/46* (2006.01)
*H02K 3/32* (2006.01)
(52) U.S. Cl. .................... 310/71; 310/194; 310/260
(58) Field of Classification Search ............... 310/71, 310/194, 260
See application file for complete search history.

(56) References Cited

U.S. PATENT DOCUMENTS 3,495,109 A * 2/1970 Ames ........................ 310/71
3,984,712 A * 10/1976 Hill ........................... 310/71
4,039,875 A * 8/1977 Morreale ................... 310/194
4,386,288 A * 5/1983 Laurie ...................... 310/49 R
5,969,455 A * 10/1999 Sakamoto .................. 310/194
6,127,760 A * 10/2000 Nagasaki et al. ........... 310/254
6,856,055 B2 * 2/2005 Michaels et al. ............ 310/71
6,933,636 B2 * 8/2005 Miya et al. ................. 310/71
2002/0175574 A1 * 11/2002 Okazaki et al. ........... 310/68 B
2004/0119350 A1 * 6/2004 Miya et al. ................. 310/71

FOREIGN PATENT DOCUMENTS

| EP | 1184957 A2 | * | 3/2002 |
| GB | 2325787 A | * | 12/1998 |
| GB | 2333647 A | * | 7/1999 |
| JP | 63-011036 | * | 1/1988 |
| JP | 3-159535 | * | 7/1991 |
| JP | 05-308742 | * | 11/1993 |
| JP | 08-196068 | * | 7/1996 |
| JP | 10-248217 | * | 9/1998 |
| JP | 11-018331 | * | 1/1999 |
| JP | 2000-041371 | * | 2/2000 |
| JP | 2002-58228 A | | 2/2002 |

* cited by examiner

*Primary Examiner*—Burton Mullins
(74) *Attorney, Agent, or Firm*—Ernest A Beutler

(57) ABSTRACT

An improved armature construction in which a coil winding wiring board and cooperating insulator around which the coils are wound at least in part wherein the insulator and wiring board are interconnected by an attachment arrangement that automatically positions and retained components in the desired circumferential, axial and radial positions.

7 Claims, 14 Drawing Sheets

US 7,385,323 B2

ARMATURE OF ROTARY ELECTRICAL DEVICE

BACKGROUND OF INVENTION

This invention relates to a rotating electrical machine and more particularly to an improved armature construction for such machines.

As is well known, most armatures for rotating electrical machines be they either motors or generators consist of a core made of a ferromagnetic material and generally laminated in construction. The core defines a plurality of radially extending pole teeth around which electrical coils are wound. Generally these windings surround an insulating bobbin arrangement. In addition the armature includes a wiring base to which the ends of the coil windings ate attached to provide the external electrical connection for the machine. Thus there are a number of separate components that must be fixed together.

In addition to the establishment of the connection of the various elements it also is important to insure their correct axial, radial and circumferential relationship. U.S. Letters Pat. No. 6,566,779, issued May 20, 2003 and assigned to the assignee hereof and Japanese Published Application, publication number 2002-58228, which represents an improvement in the structure shown in that patent and its Japanese priority application, illustrate a construction in which a wiring base of a three layer constitution placed on the axial end of the armature of a rotary electric machine. Like the other and above described prior art, the armature comprises a laminated core comprised of a circular portion from which a plurality of magnetic pole teeth extend radially. A two part bobbin made of insulating resin attached to the core and has portions that encircle each of the magnetic pole teeth.

In accordance with that patent and the published Japanese application, the bobbin is provided with a stopper for attaching the wiring base. The stopper is made of a metallic plate that projects outward from the bobbin and is bent toward the wiring base to form an L shape. The wiring base comprised of three layers for three phases of U, V, and W and is of an annular shape. It also has a plurality of engaging holes arranged in a circular row near its periphery that receive the stopper. Parts of the stoppers project out of the engaging hole. The wiring base is fixed to the remainder of the armature by depositing a solder mass on the projecting ends of the stopper.

Although effective, this attachment method is labor intensive. In addition, the shape, dimension and axial, circumferential and radial positioning may vary unacceptably.

It is therefore a principal object of this invention to provide an improved armature structure.

It is a further object of this invention to provide an improved attachment method for the wiring base that is simpler, less labor intensive and more accurate.

SUMMARY OF INVENTION

This invention is adapted to be embodied in an armature construction for a rotating electrical machine comprised of a core consisting of a plurality of laminated plates having a circular member from which a plurality of pole teeth radially extend A pair of insulators are positioned on opposite axial sides of the core and having tooth engaging portions encircling the pole teeth to receive coil windings.

A wiring base is positioned on one axial side of one of the insulators. The wiring base is made from an insulating material and is adapted to receive the wire ends of the coil windings. Interconnecting members are formed on the one insulator and the wiring base for connecting the wiring base in a predetermined axial, radial and circumferential position

DETAILED DESCRIPTION

Figure 1:
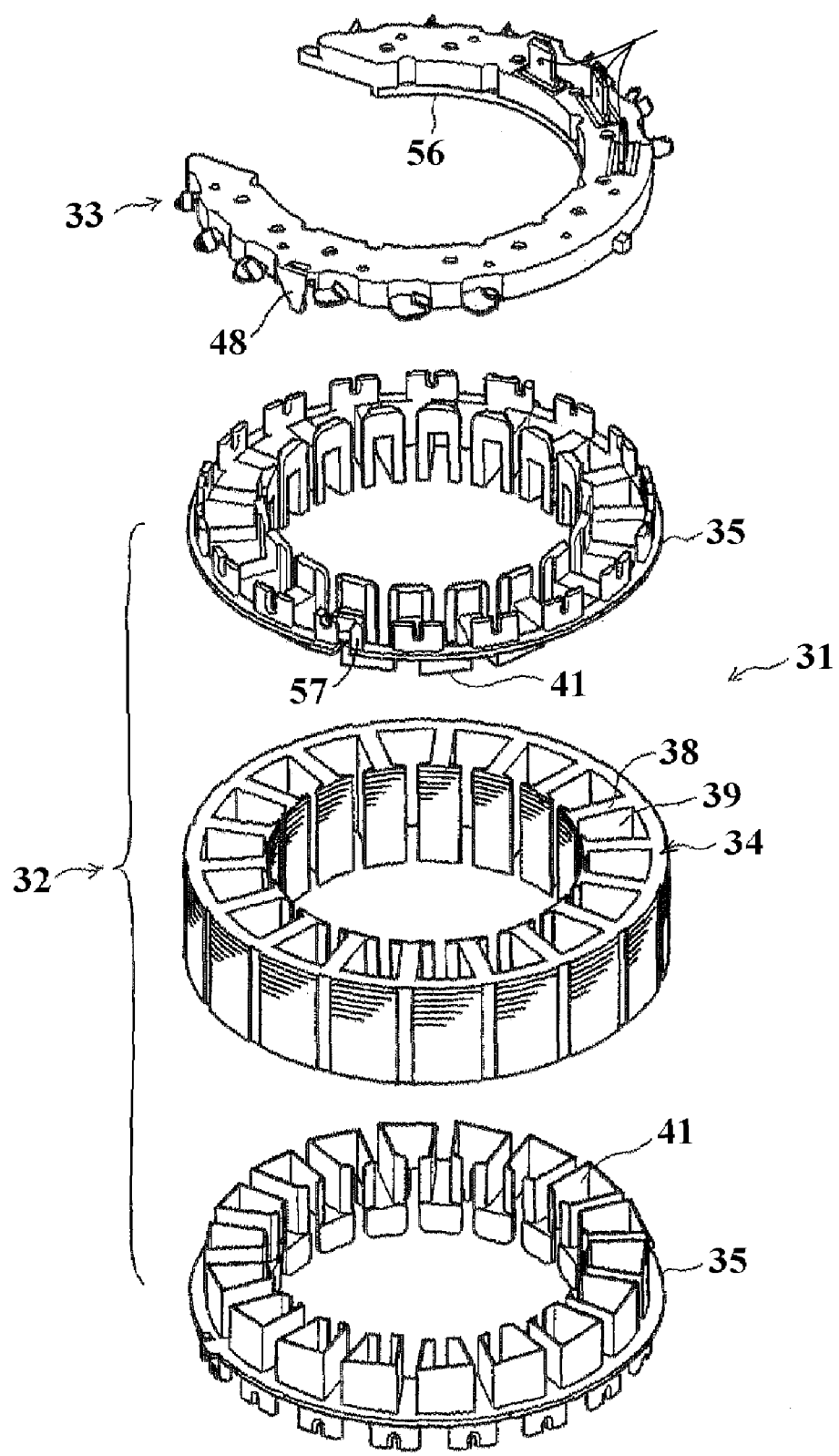
FIG. 1 is an exploded, perspective view of an armature constructed in accordance with the invention.

Referring now in detail to the drawings and initially to FIG. 1, the reference numeral 31 indicates generally an armature of a rotary electric machine embodying to this invention. As illustrated the armature 31 is specifically utilized as an armature for a 3-phase motor, although those skilled in the art will readily understand that it can be utilized with other types of motors or generators. It is comprised of a wound core, indicated generally at 32, and a wiring base 33 acting as a coil end circuit fixed in a manner to be described to one axial end (top end side in the FIG. 1) of the wound core 32.

Figure 22:
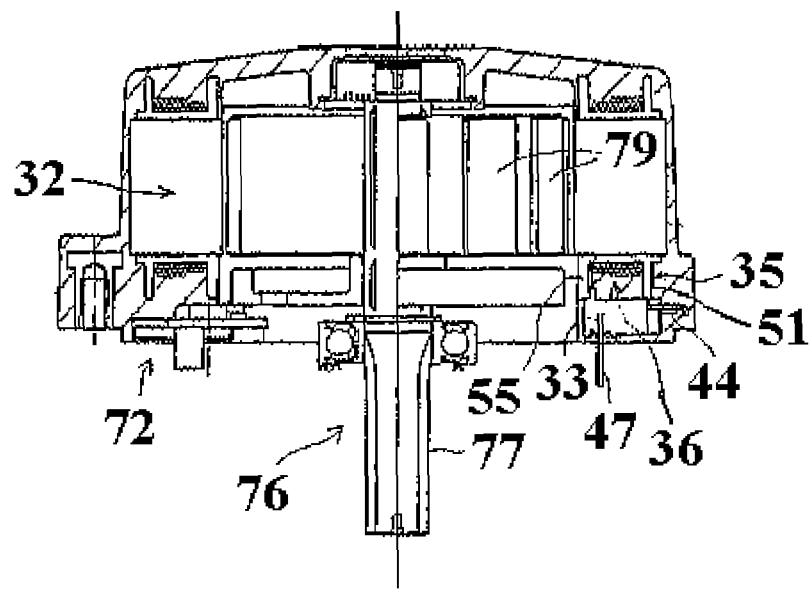
FIG. 22 is a cross sectional view of a completed machine embodying the invention.
Figure 23:
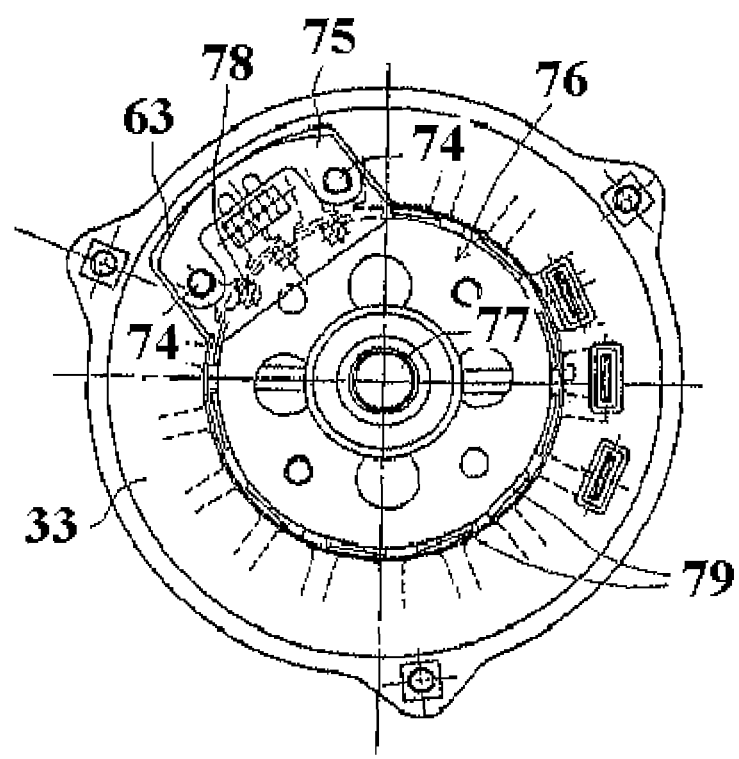
FIG. 23 is an end elevational view of the machine.

The wound core 32 is comprised of a core yoke, indicated generally at 34, made as a body of laminated thin plates, upper and lower bobbin half insulators 35, and coils 36 (See FIG. 19) wound on the wound core yoke 34 around the insulators 35. The core yoke 34 has a ring shape portion, indicated at 37, from which in this embodiment, extend radially inwardly a plurality of circumferentially spaced magnetic pole teeth 38 so as to surround the periphery of a rotor 36 (FIGS. 22 and 23).

Slots 39 are formed between adjacent magnetic pole teeth 38. The faces of the insulators 35 are integrally formed with insertion lugs 41 of the same number as the slots 39 so that when the ring-like insulator 35 are inserted upward and downward into the slots 39 both insulators 35 are circumferentially secured and held to the core yoke 34 in the desired circumferential relation. As will be described later again, coil wire is wound up and down over the insulators 35 through the slots 39 located on both sides of each magnetic pole tooth 38, so that plural coils 36 (FIG. 19) are arranged in a circular row.

Figure 2:
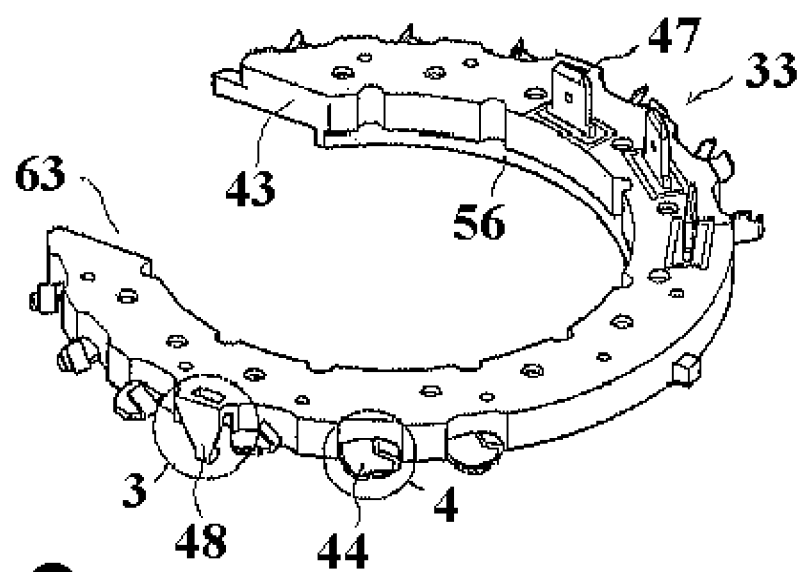
FIG. 2 is an enlarged perspective view of the wiring base.
Figure 3:
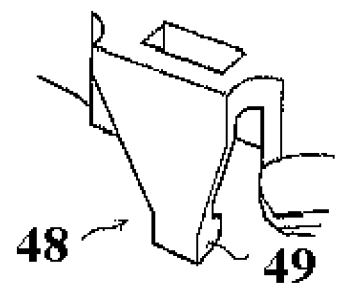
FIG. 3 is a further enlarged view of the area encompassed by the circle 3 in FIG. 2.
Figure 4:
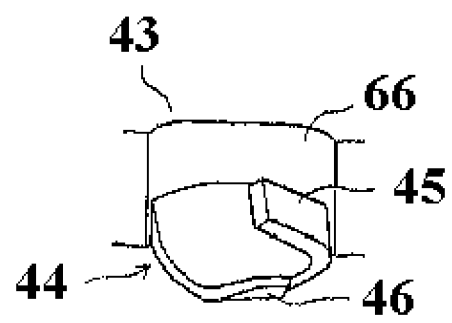
FIG. 4 is a further enlarged view of the area encompassed by the circle 4 in FIG. 2.
Figure 9:
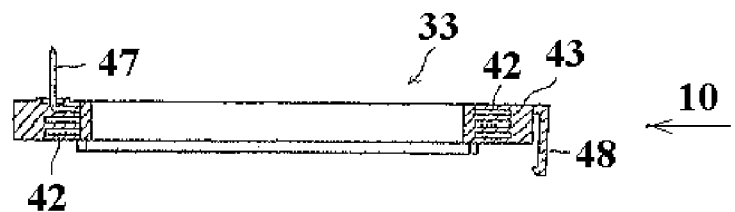
FIG. 9 is a cross sectional view of the wiring base.
Figure 10:
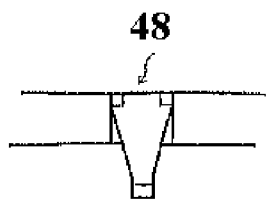
FIG. 10 is an enlarged view looking in the direction of the arrow 10 in FIG. 9 and showing the attachment hook.
Figure 11:
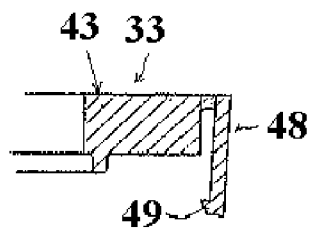
FIG. 11 is a cross sectional view of the hook.

The wiring base 33 is attached to the top surface of the wound core 32, in a manner to be described, and is shown best in FIGS. 2-4. The wiring base 33 is of a three layer construction made up of ring-like, phase-specific terminal members 42 (See FIG. 9) corresponding to three phases of U, V, and W placed one over another in the axial direction and insulated from each other. The phase-specific terminal members 42 are made into a single body by insert mold forming with a resin material. As shown in FIG. 2, the wiring base 33 is of a ring shape (C shape) made as a single body with a molded resin 43.

Each phase-specific terminal member 42 has plural terminal lugs 44 projecting radially outward for connecting a winding head or winding tail of each winding end portion 33 of the coil 36 of each phase. The terminal lug 44 has its tip bent as shown in the enlarged view FIG. 4 so that a worker can easily tie and hold the winding end portion around the terminal lug 44 when the coil winding end is to be connected. Continuing to refer to FIG. 4 and as will be described in more detail later, the reference numeral 45 denotes for a soldering-purpose bend for clinching and soldering the winding end, and a bend 46 for retaining the winding end from coming off.

Each phase-specific terminal member 42 also has an integrally formed external connection terminal 47 corresponding to each of the three phases of U, V, and W. As shown in FIG. 2, the external connection terminal 47 is formed to project from axially one side face of the wiring base 33 toward the opposite side of the wound core 32 by bending part of the phase-specific terminal member or by initially punch-raising from the main part of the member when it is formed.

The periphery of the wiring base 33 has integrally formed plural (two at diametrically opposite positions in the example illustrated) hooks 48 serving as secure-holding means to properly position the wiring base 33 relative to the insulator 35 when fitted into the wound core 32 and to secure the wiring base 33 to the wound core 32. The shape of the hooks is best shown in the perspective view FIG. 3. As seen there the hook 48 is formed in a triangular shape, projecting down from the end face of the wiring base 33 to be elastically, radially deformable. The tip of the hook 48 is formed with a barb 49 that projects radially inward.

Figure 5:
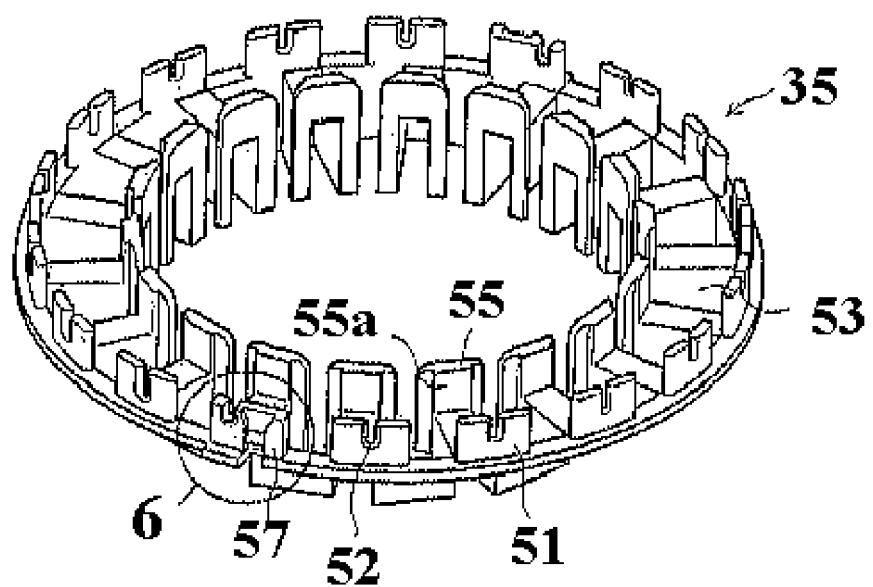
FIG. 5 is an enlarged perspective view of one of the bobbin halves.

The configuration and construction of the insulator 35 to accommodate and make the connection to the wiring base 33 will now be described with reference primarily to FIGS. 5 and 6. The insulator 35 is formed like the core yoke 34 in a ring shape. Formed on its axial periphery are a plurality of winding receivers, indicated generally at 51 in the same number (18) as the pole teeth 36 for engage-stopping the coil winding end. Each winding receiver 51 is formed with a cut 52 through which the winding end of the coil is led radially outwardly of the insulator 35.

The insulator 35 is also formed integrally with plural winding portions 53 that extend radially inward from the winding receivers 51. The winding portions 53 are aligned with the magnetic pole teeth 38 (FIG. 1) of the core yoke 34 by the pole teeth 38 being fitted into recesses 54 formed on the side of the insulator 35 adjacent the core yoke which embrace the pole teeth 38. The slots 39 are formed between adjacent winding portions 53. The aforementioned insertion lugs 41 are formed under the winding portions 53 in the area between them. Each winding portion 53 has on its radially inner side a curved flange 55 for supporting and retaining the inside of each coil.

The winding of the coil 36 is retained at one end by the inside round portion of the flange 55. Incidentally, the winding comprises the part of the coil 36, formed by winding a wire passing through the slot 39 (FIG. 1) up and down around the magnetic pole tooth 38. The coil winding is held and supported between the flange 55 formed on the inside round surface side of both the upper and lower insulators 35 and the winding receiver 51. An annular projection 56 (FIG. 2) on the underside of the wiring base 33 is engaged with a back surface 55*a* of the flange 55 supporting the coil end. In this way, the insulators 35 and the wiring base 33 are held in the same radial position.

The round periphery of the insulator 35 is further formed integrally with a plurality of circumferentially spaced hook receivers 57 equal in number and spacing to the number and spacing of the hooks 48 for receiving the hooks 48 of the wiring base 33. Thus in this embodiment the hook receivers 57 are diametrically positioned.

Figure 6:
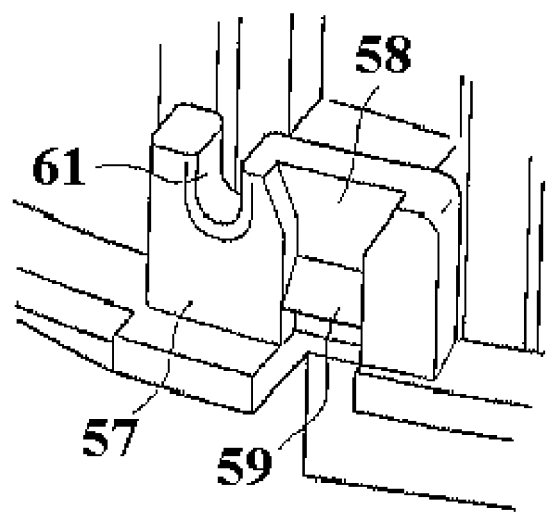
FIG. 6 is a further enlarged view of the area encompassed by the circle 6 in FIG. 5.

These hook receivers 57 are shown best in FIG. 6. The hook receivers 57 are formed like the winding receiver 51 to project upward from the end face of the insulator 35. The hook receivers have a round periphery side formed with a recess 58 to receive the hook 48. The recess 58 is triangular so as to be generally complementary to the hook 48. The end of the recess 58 is formed with a projection 59 for engaging with the barb 49 formed at the tip of the hook 48. The hook receiver 57 is also provided with a cut 61, next to the recess 58, for passing the wiring end of the coil 36. Each hook 48 is capable of elastically bending about a center specifically the connection point between the hook 48 and the main part of the molded resin 43. When the hook 48 engages with the hook receiver 57, the tip of the hook 48 slightly deflects radially outward and then the barb 49 snap-engages with the projection 59 of the hook receiver 57.

Figure 7:
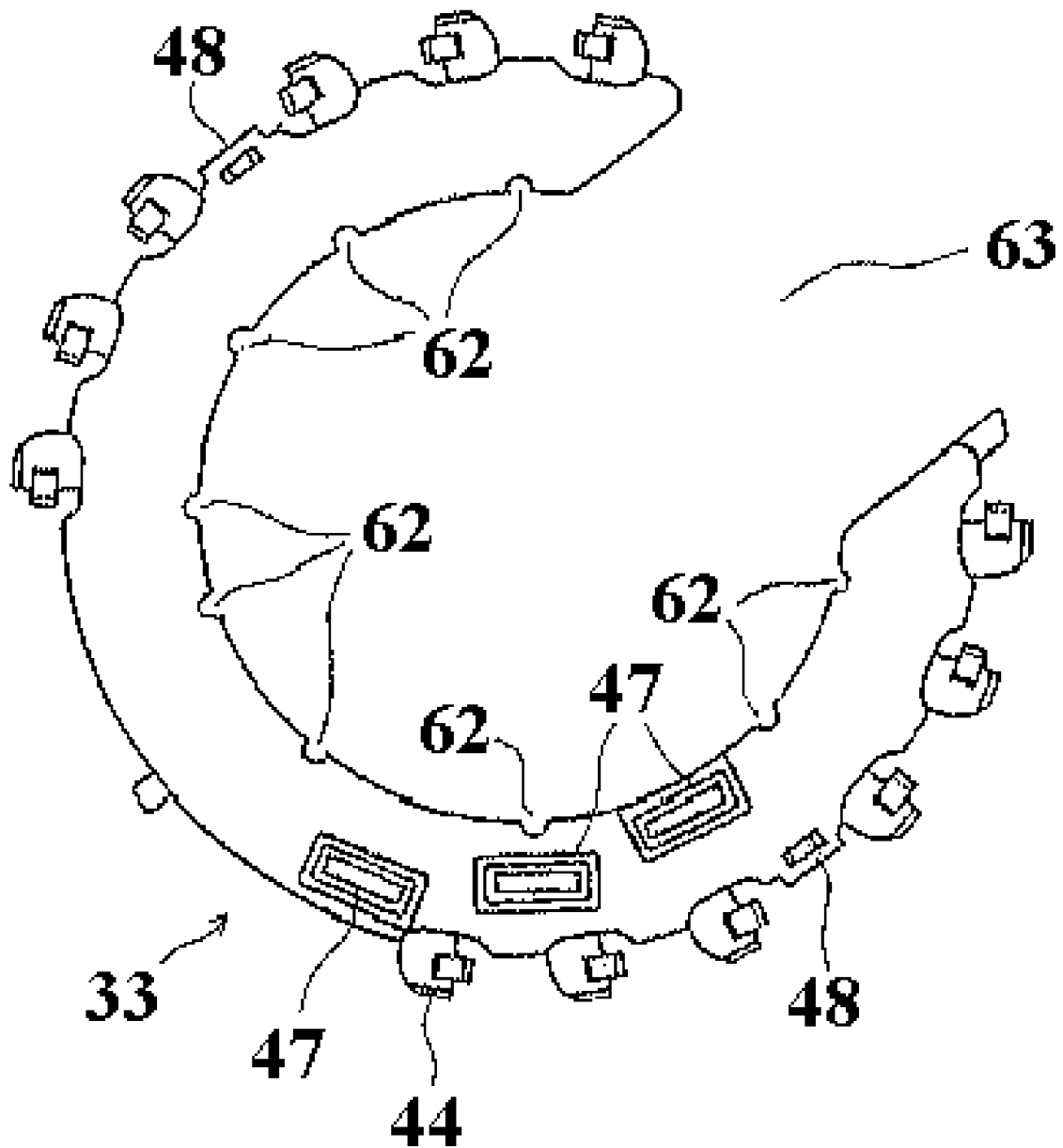
FIG. 7 is a side elevational view of the wiring base.
Figure 8:
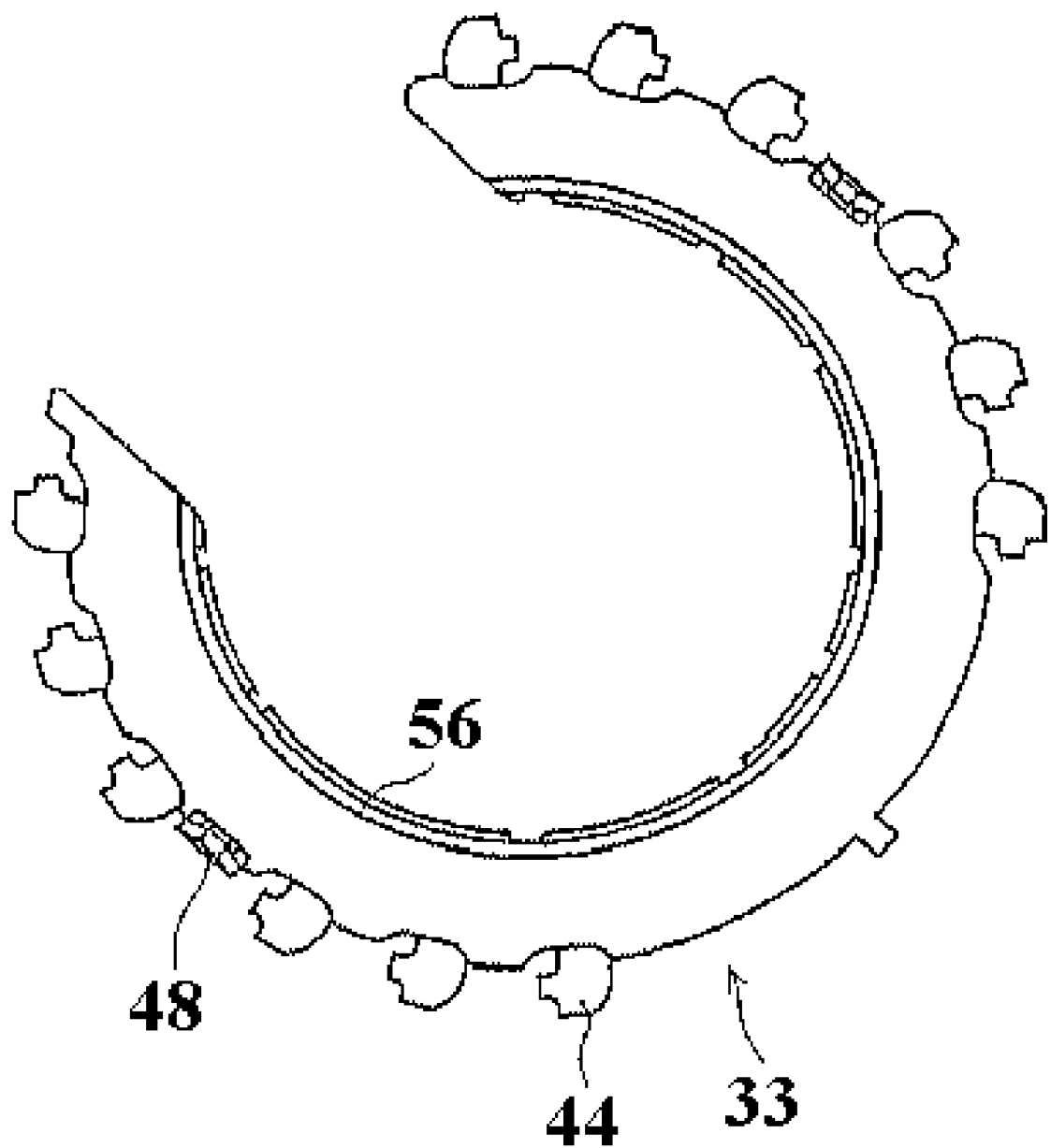
FIG. 8 is an elevational view of the wiring base showing the side opposite that shown in FIG. 7.

Referring now to FIGS. 7 and 8, these show respectively the outer and inner faces of the wiring base 33. As seen in these figures, the terminal lugs 44 are formed to project radially outward from and spaced along the round periphery of the molded resin 43 of the wiring base. The three external connection terminals 47 project from positions different in both radial and circumferential locations on the wiring base 33.

The inside round surface of the molded resin 43 is provided with plural, circumferentially spaced axial grooves 62. These grooves 62 are recesses, formed by projections formed on the side of a metallic mold, for radially positioning (centering) all the ring-like phase-specific terminal members 42 as seen in FIG. 6 positioned at three different levels. The molded resin 43 is provided with an opening 63 to clear a magnetic pole position detector 64 (FIG. 23) made up of a Hall element and others components for detecting the rotary position of a cooperating rotor.

As previously mentioned and as best seen in FIGS. 2 and 8, an annular (C shape in this embodiment) projection 56 is formed along the inside round surface of the underside of the wiring base 33. The annular projection 56 is for locating the wiring base 33 and the insulators 35 on a common axis as the annular projection 56 fits in tight contact with the back surface 55a (radially outer side) of each flange 55 while the hook 48 engages with the hook receiver 57 at the time of attaching the wiring base 33 to the insulators 35 which are integral with the wound core 32.

Referring now to FIG. 6 the three ring-like, phase-specific terminal members 42 are embedded in the molded resin 43, at three levels in the axial direction, corresponding to the three phases of U, V, and W, in the wiring base 33. As shown, part of the topmost phase-specific terminal member 42 bends upward and projects out of the molded resin 43 to serve as the external connection terminal 47. Although not shown, parts of other phase-specific terminal members 42 also bend likewise to serve as the rest of the external connection terminals 47. Incidentally, the terminal lugs 44 are not shown in this figure.

Figure 12:
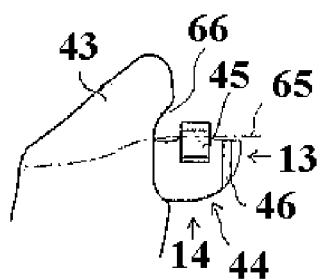
FIG. 12 is an enlarged view showing one of the terminal ends.
Figure 13:
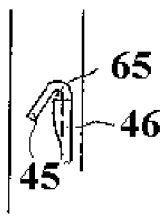
FIG. 13 is a view looking in the direction of the arrow 13 in FIG. 12.
Figure 14:
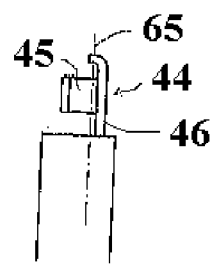
FIG. 14 is a view looking in the direction of the arrow 14 in FIG. 12.

FIGS. 12-14 show the appearance of the terminal lug 44 projecting on the periphery of the wiring base 33. As is clear from these views and FIG. 4, the terminal lug 44 is made by punching a metallic sheet followed by bending, with its tip having the two bends 45 and 46. The bend 45 is formed by bending back in a V shape to serve as a soldering terminal for clinching and fusing the coil winding end portion, indicated as 65. The other bend 46 is made by bending an end portion upright to serve as a holding lug for preventing the winding end portion 65 clinched with the fusing terminal (bend 45) from coming off the V-shape opening of the bend 45. In this way, a worker, before connecting the winding end portion to the terminal lug 44, can easily engage-stop the winding end portion with the terminal lug 44 by twining the winding end portion around the bend 45. In other words, the winding end portion 65, in reference to FIG. 12, at first in the state of projecting on the unseen side of the terminal lug 44, is then pulled up (as seen in the figure), passed through a recess 66 of the molded resin 43 and taken up to the visible side of the terminal lug 44, routed around through the gap between the molded resin 42 and the bend 45 toward the V opening, drawn deep into the V space and out to be caught with the top end side of the holding bend 46 as seen in FIG. 13). The winding end portion is applied with soldering in the state of being clinched and held with the soldering bend 45, so that the winding end 65 is joined to the terminal lug 44.

Figure 15:
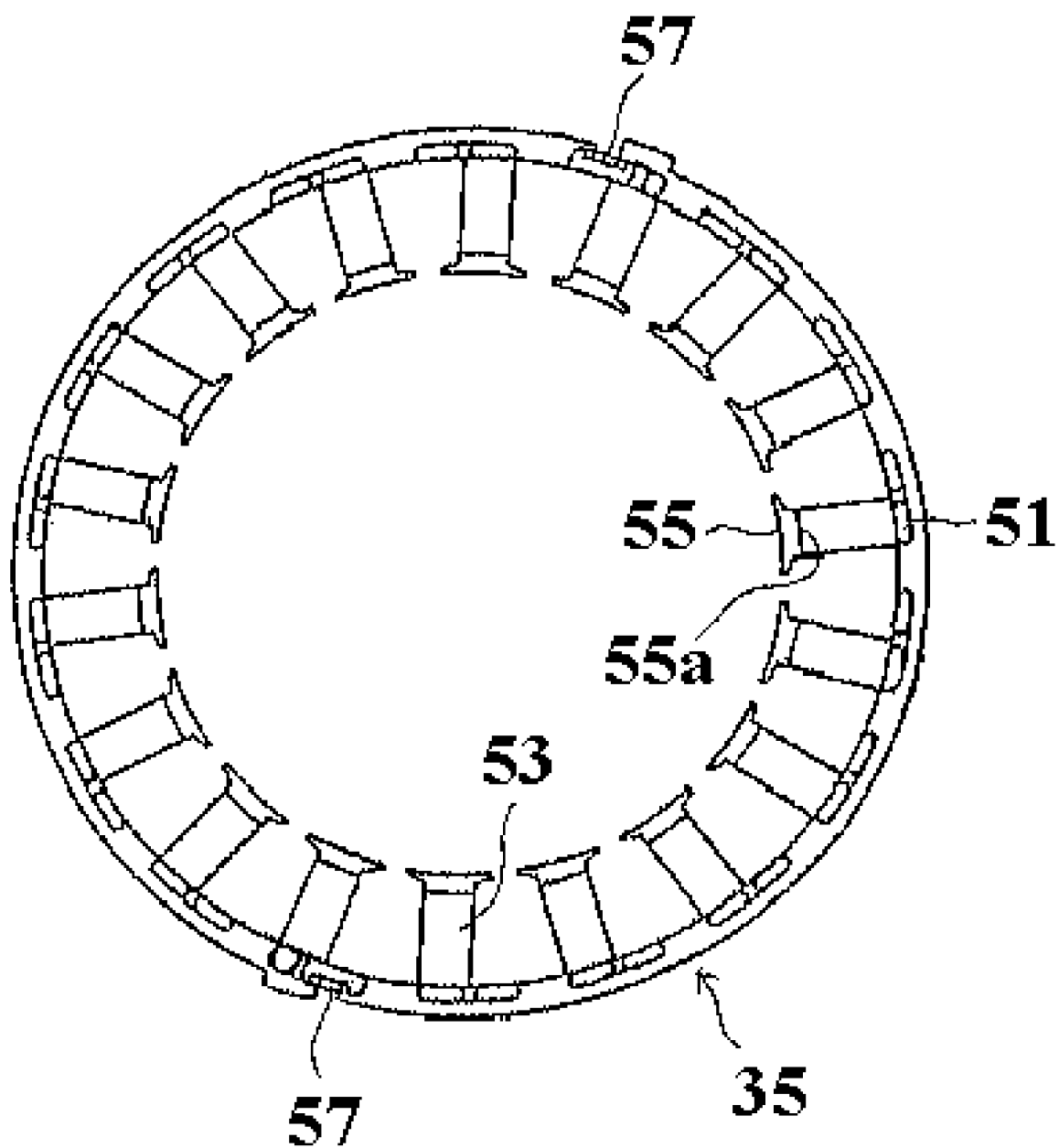
FIG. 15 is a side elevational view of one of the bobbin halves.
Figure 16:
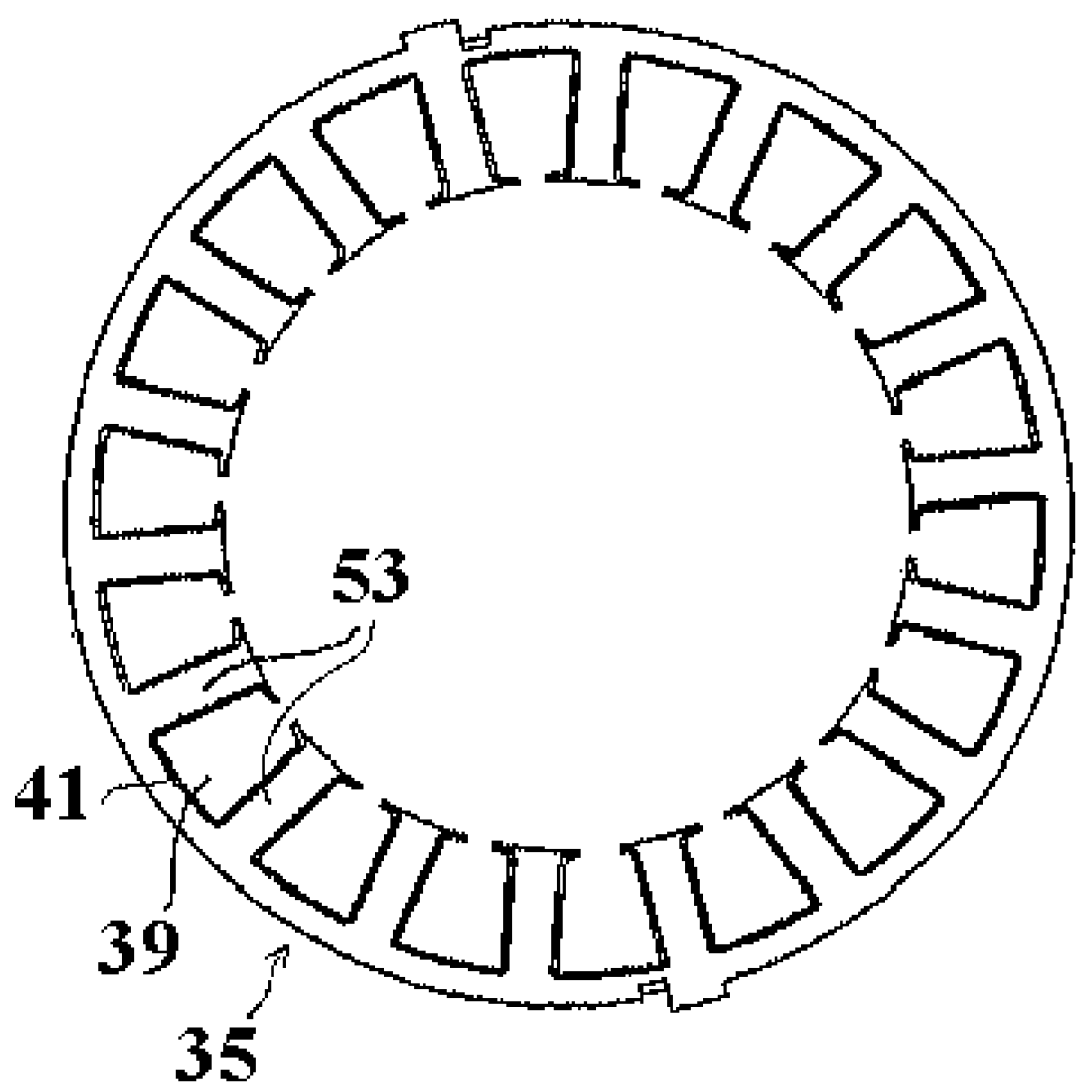
FIG. 16 is a side elevational view of the other side of the one of the bobbin halves.

Referring now to FIGS. 15 and 16, FIG. 15 shows that the winding portions 53 (18 in the illustrated embodiment) are equally circumferentially spaced. It also shows that insertion lugs 41 are formed on the reverse side of the insulator 35 in a circumferential alignment with the slots 39 formed among the winding portions 53. It also shows, as described before, that the two hook receivers 57 are diametrically spaced.

Figure 17:
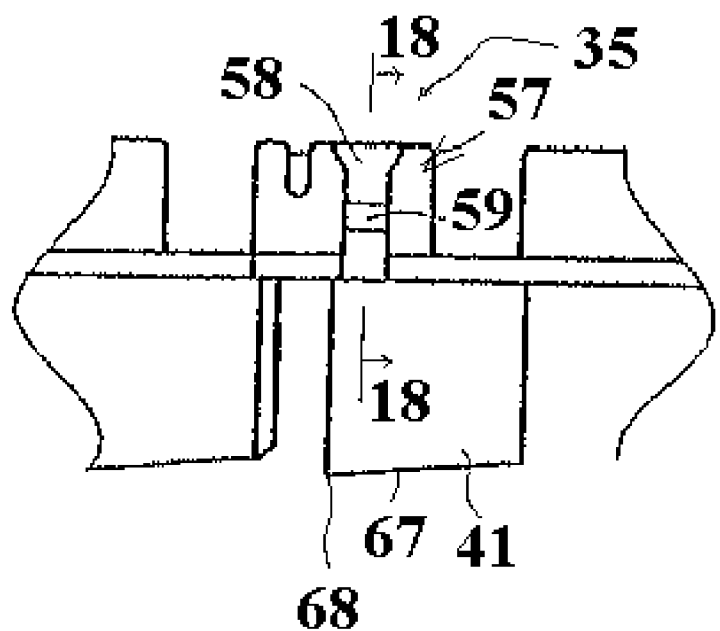
FIG. 17 is an enlarged side view of the portion of the one bobbin halve showing the attachment portion thereof.
Figure 18:
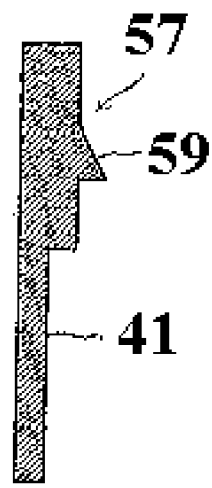
FIG. 18 is an enlarged cross sectional view taken along the line 18-18 in FIG. 17.

FIGS. 17 and 18 also shows the hook receiver 57 portion of the insulator 35, enlarged. As shown in FIG. 17, the outside wall bottom edge 67 of the insertion lug 41 is slightly tapered from the horizontal. In this way, the insertion lug 41 is shaped to project in one direction (downward in FIG. 17) from the end face of the insulator, with a corner 68 serving as a leading tip, so as to be easily inserted into the slot 39 of the core yoke 34.

As seen in FIG. 18, the hook receiver 57 of the insulator 35 has the projection 59 for engage-stopping the barb 49 of the hook 48. The projection 59 is formed in the shape of wedge or triangle in cross section so as to stop the axial movement of the wiring base 33 and prevent it from coming off the insulator 35 once the projection 59 engages with the hook 48 of the wiring base 33.

As described above, this embodiment is arranged that, when the wiring base 33 is fitted to the insulators 35 to make a unitary body, the wiring base 33 is axially positioned automatically relative to the insulators 35 as the hooks 48 are fitted to the two hook receivers 57, and the wiring base 33 is also positioned automatically in the circumferential direction. Moreover, because of the presence of the hooks 48 and the hook receivers 57, axial alignment (centering) of the both components is accomplished at the same time, so that the wiring base 33 is automatically positioned also in the radial direction relative to the insulators 35. The radial positioning is effected as described above mainly by fitting the annular projection 56 (FIG. 2) provided on the underside of the wiring base 33 onto the back surface 55a of the inside round surface flange 55 of the insulator 35. In this way, providing both of the insulator 35 and the wiring base 33 respectively with the hook 48 and the hook receiver 57 facilitates the positioning work which has so far been complicated, and improves its accuracy without requiring other positioning jigs.

Figure 19:
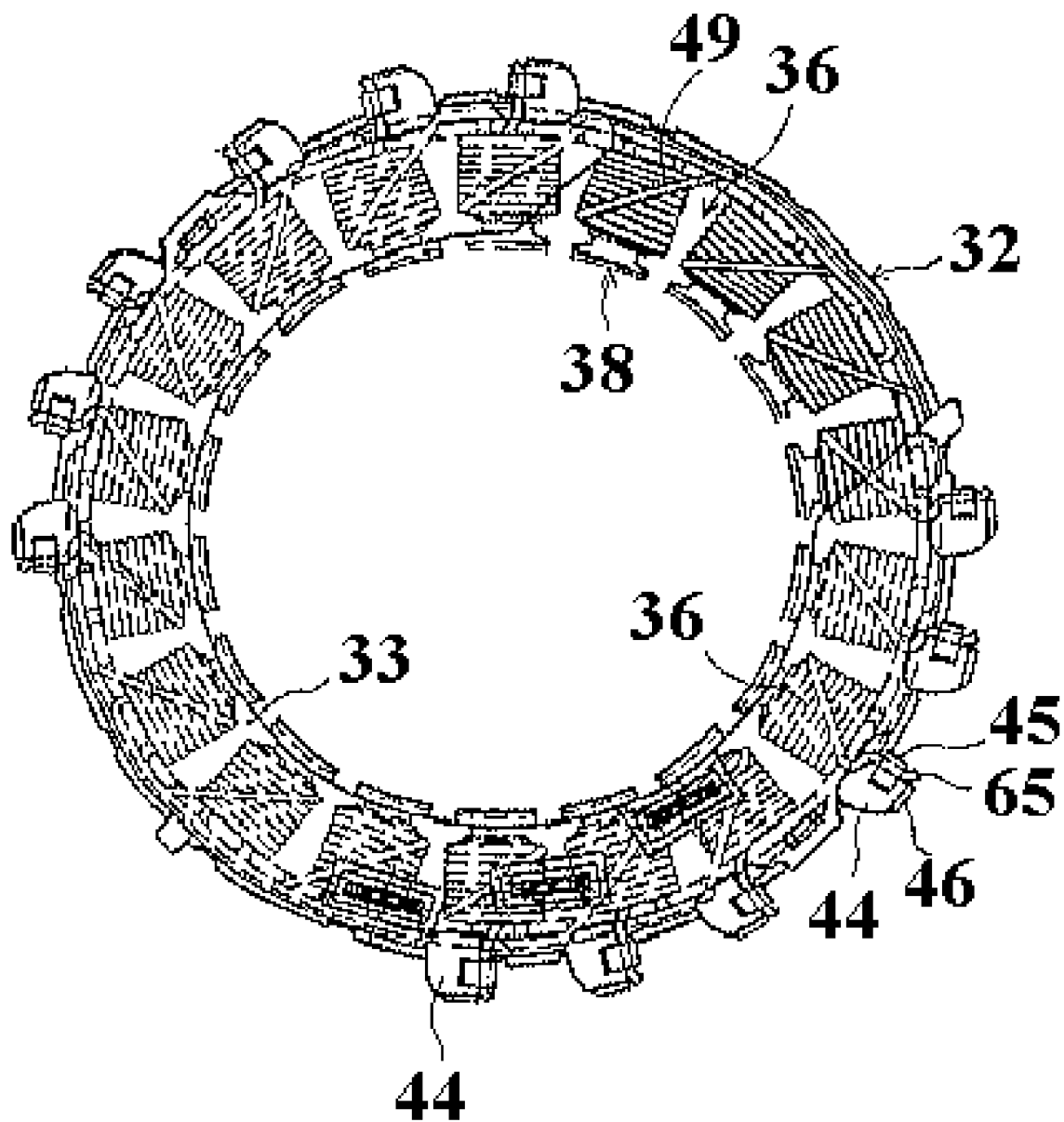
FIG. 19 is a side elevational view of the wound armature.

Referring now to FIG. 19, this shows the wiring base 33 attached to the wound core 32. As seen from the figure, the coils 36 are wound on the 18 magnetic pole teeth 38 of the wound core 32. These coils 36 are interconnected through the wiring base 33 which serves as the coil end circuit mentioned before. Crossover lines 69 interconnect the desired coils 36 without the intervention of the terminal lugs 44 of the wiring base 33. Thus, coils are interconnected as will be described later by reference to FIGS. 24 and 25.

Figure 20:
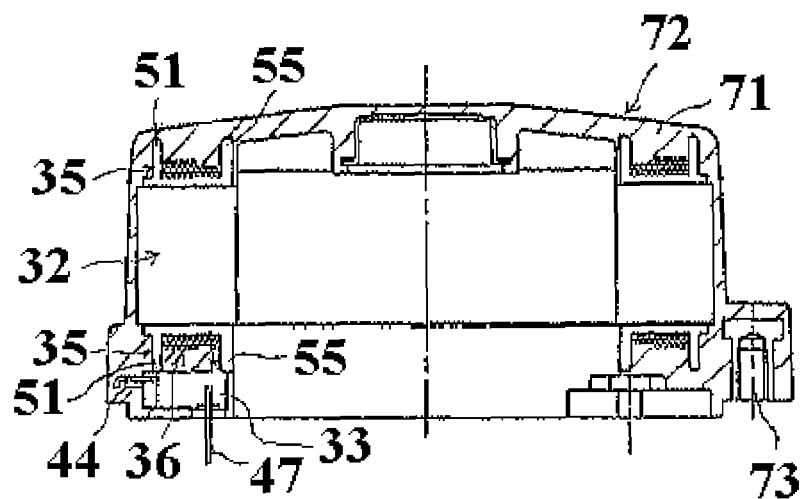
FIG. 20 is a cross sectional view of the wound armature and attached circuit board molded into a case for an electrical machine.
Figure 21:
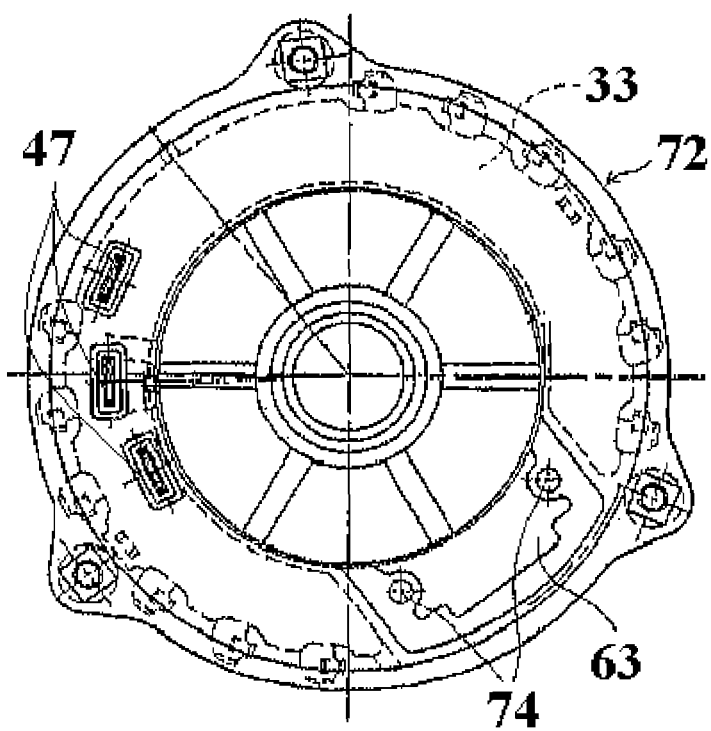
FIG. 21 is an end elevational view of the molded case.

How the aforedescribed assembly can be incorporated into a rotating electrical machine such as an electric motor will now be described by reference to FIGS. 20-24. Referring first to FIGS. 20 and 21, the wiring base 33 and connected wound core 32 are made into a single body using a molded resin 71 to form a single body motor case, indicated generally at 72. To carry out this mold forming, the wound core 32 together with the wiring base 33 are placed in a mold (not shown). As resin material is poured into the mold cavity, the single body, the motor case 72 including the wound core, is formed. The motor case 72 formed in the mold as described above has three external connection terminals 47 projecting from its underside as seen in FIG. 21.

Screw receivers 73 are for attaching the motor end plate which is not shown. Also projections 74 are provided on the sides of the opening 63 as aforenoted for attaching a magnetic pole position detecting base 75 shown in FIG. 23.

Referring now to FIGS. 22 and 23, these show a rotor unit 76 is fitted in the motor case 72. The rotor unit 76 is installed in the motor case 72 with a rotor shaft 77 as the motor output shaft projecting from the motor case 72. The magnetic pole position detecting base 75 has mounted on it a Hall element 76 for detecting rotary magnetic pole position of the rotor unit 76. Finally permanent magnets 78 are attached to the outer surface of the rotor unit 76.

Figure 24:
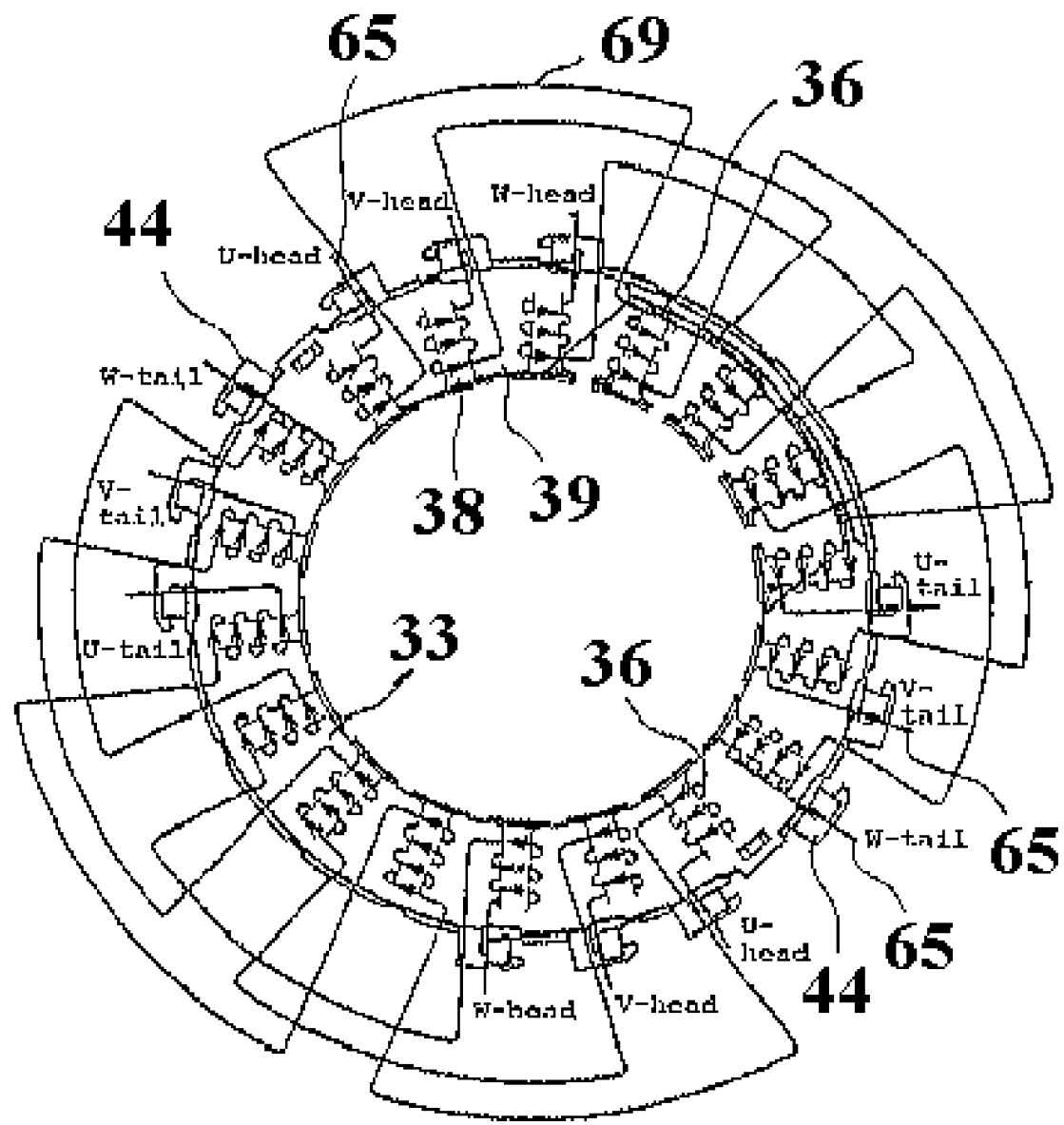
FIG. 24 is a view showing the machine wiring.

Referring now to the wiring diagram of the armature 31 in FIG. 24 the showing winding head and winding tail of the coils of the phases U, V, and W. A winding end 65 of a specific coil is connected to the terminal lug 44 of the wiring base 33. The winding ends of the coils connected to the respective terminal lugs 44 are connected through the phase-specific terminal members 42 embedded in three layers in the wiring base 33.

Figure 25:
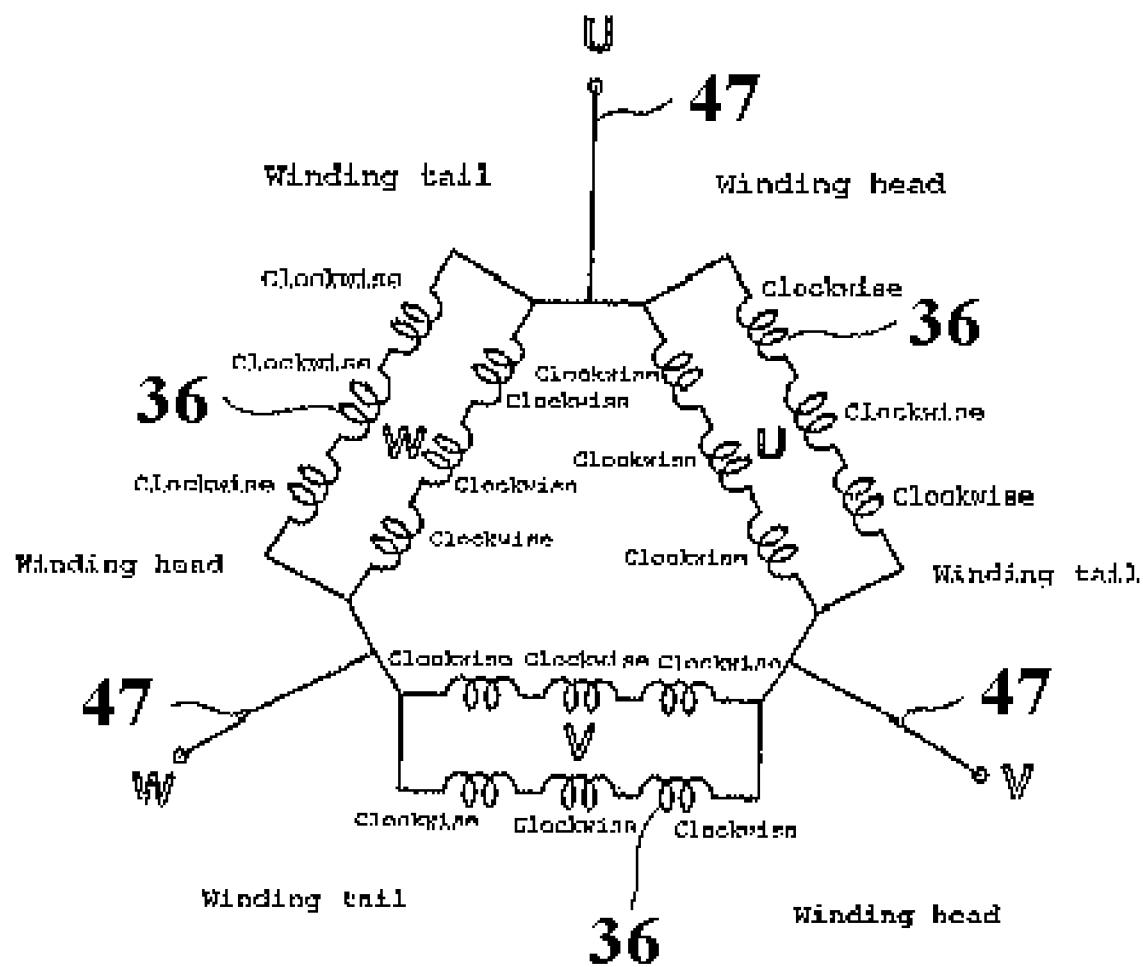
FIG. 25 is a wiring diagram of the machine.

FIG. 25 is a simplified view of the circuit of the connecting construction shown in FIG. 24. This embodiment shows a three-coil-series, two-parallel connection, with each phase formed with six coils, with two coil sets in parallel, each set having three coils in series. The phases U, V, and W shown in the figure are connected to the external connection terminals 47 of the wiring base 33.

Thus it should be apparent from the foregoing description that providing the means for defining the position of the wiring base in the axial, radial, and circumferential directions relative to the insulator of the wound core to which the wiring base is fitted makes it possible to attach and secure the wiring base to the wound core through the insulator while accomplishing proper positional relationship between the wiring base and the insulator without using an auxiliary equipment such as a positioning jig. Of course those skilled in the art will readily understand that the described embodiment is only exemplary of form that the invention may take and that various changes and modifications may be made without departing from the spirit and scope of the invention, as defined by the appended claims.

The invention claimed is:

1. An armature construction for a rotating electrical machine comprised of a core consisting of a plurality of laminated plates having a circular member from which a plurality of pole teeth radially extend, a pair of insulators positioned on opposite axial sides of said core and having cooperating tooth engaging portions completely encircling said pole teeth and receiving coil windings there around, a wiring base positioned on one axial side of one of said insulators, said wiring base being made from an insulating material and receiving and retaining the wire ends of the coil windings, and axially facing interconnecting members formed on said one insulator and said wiring base for connecting said wiring base in a predetermined axial, radial and circumferential position including a cooperating cylindrical flange and circumferentially spaced interengaging shoulders for assisting in the radial positioning.

2. An armature construction as set forth in claim 1 wherein the interconnecting members comprise a pair of interconnecting elements, one on each of the one insulator and the wiring base.

3. An armature construction as set forth in claim 1 wherein there are a plurality of circumferentially spaced interconnecting members.

4. An armature construction as set forth in claim 3 wherein each of the interconnecting members comprise a pair of interconnecting elements, one on each of the one insulator and the wiring base.

5. An armature construction as set forth in claim 2 wherein the interconnecting elements are engageable upon relative axial movement of the wiring base and the insulator in one direction and once engaged prevent relative movement in a direction opposite the one direction.

6. An armature construction as set forth in claim 5 wherein the interconnecting elements comprise a barbed hook and a receiver therefore.

7. An armature construction as set forth in claim 6 wherein there are a plurality of circumferentially spaced interconnecting members.

* * * * *